Figure 1:
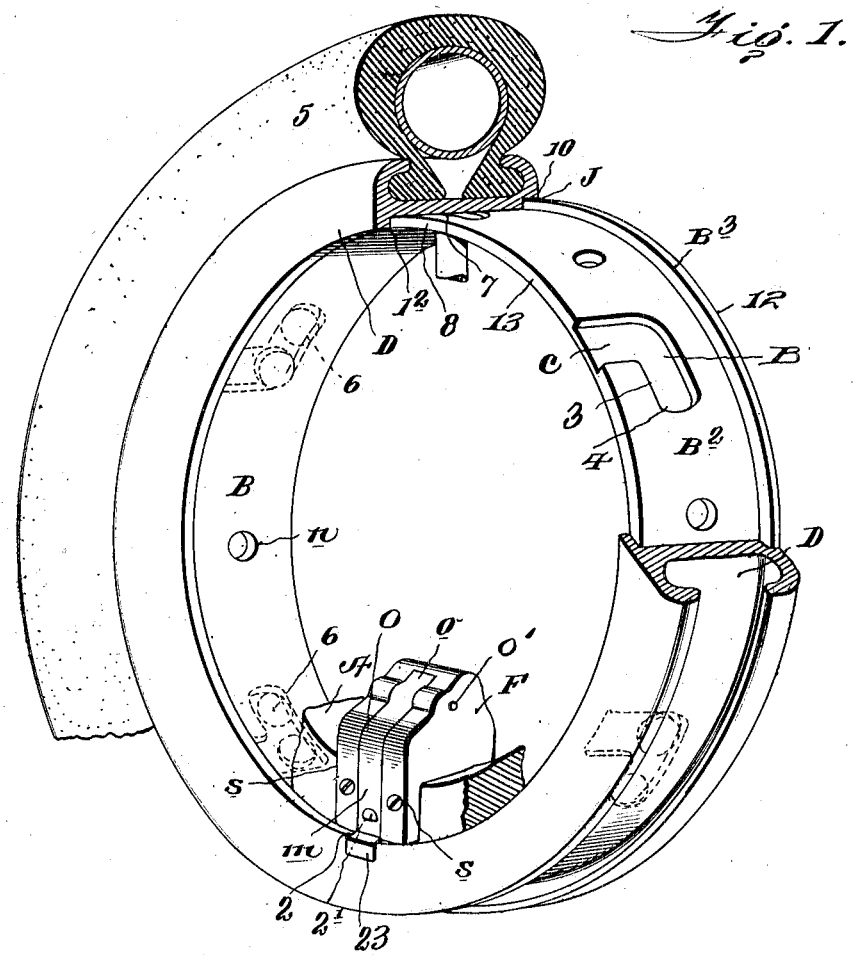

C. S. GOODFELLOW.
DEMOUNTABLE RIM.
APPLICATION FILED FEB. 8, 1912. RENEWED FEB. 3, 1914.

1,099,173.

Patented June 9, 1914.

2 SHEETS—SHEET 1.

Witnesses

Inventor
C. S. Goodfellow

C. S. GOODFELLOW.
DEMOUNTABLE RIM.
APPLICATION FILED FEB. 8, 1912. RENEWED FEB. 3, 1914.
1,099,173.
Patented June 9, 1914.
2 SHEETS—SHEET 2.
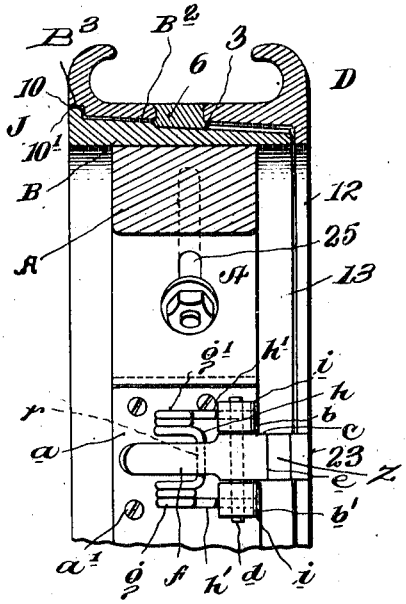
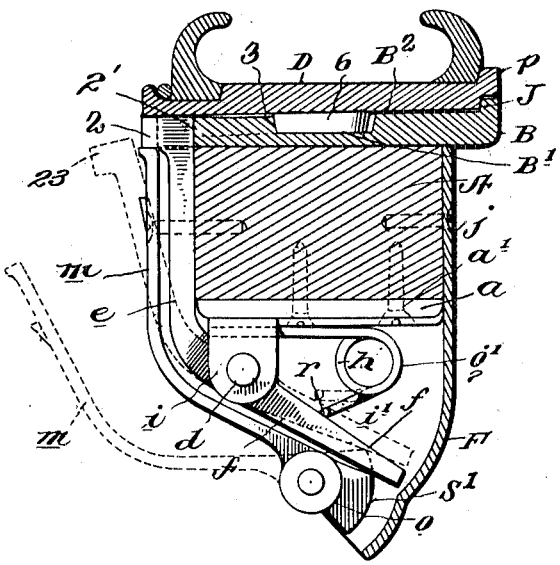
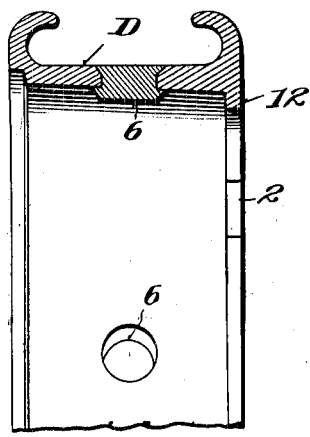
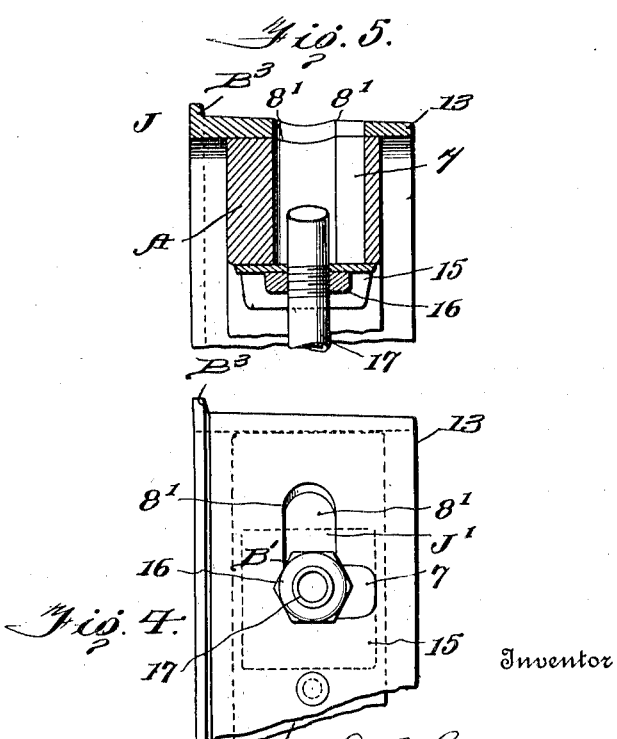
Witnesses
Jas. E. Dodge
W. May Donnell
Inventor
C. S. Goodfellow

UNITED STATES PATENT OFFICE.

CHARLES S. GOODFELLOW, OF JERSEY CITY, NEW JERSEY, ASSIGNOR TO ALBERT HIGSON AND GUSTAV H. MARTENS, BOTH OF JERSEY CITY, NEW JERSEY.

DEMOUNTABLE RIM.

1,099,173.          Specification of Letters Patent.      Patented June 9, 1914.

Application filed February 8, 1912, Serial No. 676,201. Renewed February 3, 1914. Serial No. 816,297.

*To all whom it may concern:*

Be it known that I, CHARLES S. GOODFELLOW, a citizen of the United States, residing at Jersey City, in the county of Hudson and State of New Jersey, have invented certain new and useful Improvements in Demountable Rims; and I do hereby declare the following to be a full, clear, and exact description of the invention, such as will enable others skilled in the art to which it appertains to make and use the same.

The invention relates to demountable or detachable tires for vehicle wheels, being especially adaptable to the wheels of automobiles and similar vehicles; and it consists generally in providing a wheel with a sectional rim, one of the sections being secured to the felly of the wheel and the other, in which the pneumatic tire is seated, being detachably secured upon the fixed section, so that by a slight circumferential movement and a similar outward lateral movement the detachable section may be easily and quickly removed and the tire, carried by said detachable section, readily demounted.

The invention further consists in the novel and peculiar construction of the two sections composing the rim, and the means by which the fixed and detachable sections are united together.

The invention still further consists in providing a suitable housing for the locking means to protect the operative parts of the locking means from dirt, snow or ice. And the invention still further consists in the general arrangement and combination of the several parts, as will be hereinafter fully described in this specification and briefly stated in the claims.

One of the chief objects of the invention is to so construct a sectional rim that upon a proper movement of one section upon the other the two sections will be securely locked against lateral and circumferential movement without the use of bolts, clamps or other locking devices common in the art.

Another object of the invention is to provide the fixed section with a slightly inclined outer periphery, so as to facilitate the operation of attaching the detachable section thereto, and to provide each section, at one side thereof, with a circumferential flange or rib to serve as stops to limit the lateral movement of the detachable section in one direction.

Still another object of the invention is to so arrange the two sections that the detachable sections will be supported at equidistant points upon the fixed section so as to provide sufficient vibration between said points of support to prevent any tendency of the parts adhering together.

Still another object of the invention is to provide an efficient locking means to lock the detachable section to the fixed section against circumferential movement, which may be operated either by hand or caused to operate automatically in locking the parts together.

These and other objects of the invention will become apparent upon a complete disclosure thereof.

In the drawings: Figure 1 is a perspective view partly in transverse section of my sectional rim as applied to the felly of a vehicle, showing a portion of a pneumatic tire seated therein; Fig. 2, a plan view, partly in transverse section, of the inner periphery of a portion of the sectional rim and felly; Fig. 3, a similar view of the detachable section; Fig. 4, a plan view of the inner periphery of a portion of the sectional rim, showing the valve tube; Fig. 5, a central transverse section of Fig. 4; Fig. 6, a transverse section through the felly and sectional rim, showing the locking means inclosed by a housing; and Figs. 7 and 8, transverse sections of the fixed and detachable sections of the rim, showing modified constructions of the same.

Figure 8:
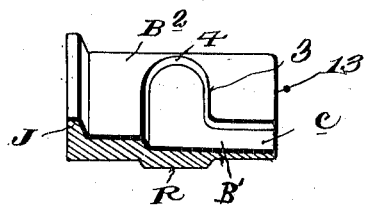

Referring to the several views, the letter A indicates the felly of an ordinary automobile wheel to which my rim is applied, said rim comprising two circumferential sections or members B and D, the member B being rigidly secured to the felly by any suitable means, such as bolts 25, passing through holes $n$, Figs. 1 and 2. The outer periphery of the member B is slightly inclined or beveled transversely, as shown at $B^2$, Figs. 2, 6 and 8, and is provided at one side with a circumferential flange or rib J to serve as a stop or an abutment wall $B^3$ to limit the lateral movement of the detachable rim D. The outer periphery of said member B is also provided with a number of right angle depressions $B'$, the entrance to which is shown at $c$ in the inner edge of the member, as shown in Figs. 1 and 8. The longitudinal portion of the depressions is situated midway between the side edges of the member, so as to hold the detachable member in true line therewith when the parts are locked together.

Figure 7:
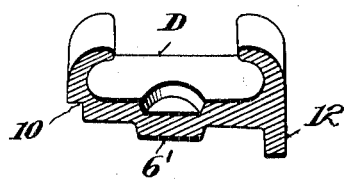

The member D has its inner periphery transversely inclined to correspond with the inclination of the outer periphery of the fixed member, and is provided with interlocking studs 6, preferably round, which are adapted to enter the right angle depressions B' and lock the detachable member to the fixed member against lateral movement. When the studs are seated at the lower end of that portion of the depression indicated by the numeral 4, the member D will be supported slightly above the surface of the fixed member, so as to provide for sufficient vibration to maintain the two members in separated position. These studs may be secured in holes in the detachable member, as shown in Figs. 2 and 3, or they may be integral with the member, as shown in Fig. 7. One edge of the detachable rim is provided with a depending flange or rib 12 to abut against the inner edge 13 of the fixed member, as shown in Figs. 1, 2, 4, 5 and 8, and its opposite edge is provided with a circumferential rabbet 10 to receive the flange or rib J of the fixed member. Passing through both members of the rim is a right angle slot J', similar in shape to the depressions B', through which slot the air-tube 17 passes, a corresponding slot being cut through the felly, as shown in Figs. 4 and 5, for the passage of said air-tube, the slot in the felly being closed by a plate 15, which is centrally perforated to admit the passage of the air-tube, which is screwed into a nut 16. The detachable member is provided with the usual side flanges which hold the pneumatic tire 5, as shown in Fig. 1, and entirely covers the fixed member.

In attaching the demountable rim to the wheel it is tilted to bring the lateral portion of the slot J', indicated by the numeral 7, in line with the air-tube, which is then inserted through said lateral portion of the slot and the detachable member shoved in place upon the fixed member; the detachable member is then moved circumferentially to cause the interlocking studs to move to the extreme end of that portion of the depressions indicated at 4, and to bring the air-tube at the extreme end of that portion of the slot J' indicated at 7, which, when accomplished, the detachable or demountable rim will be locked against lateral movement, and frictionally held by the wedging effect produced by the impinging contact of the studs on the inclined wall 3 of the depressions.

To firmly lock the detachable rim against circumferential movement upon the fixed rim, I provide a locking trigger $f$ pivoted between studs $b$ and $b'$, and held in locking engagement with slots 2 and 2', see Figs. 1 and 6, by means of a suitable spring $h$, preferably composed of two coils $g$ and $g'$ united by a cross bar $r$ and having its free ends $h'$ secured in holes $i$ in the respective studs $b$ and $b'$. The outer end of the trigger is provided with a head 23 which is adapted to be forced into the slots 2 and 2' when in registered position by the tension force of the spring $h$. The slot 2' is made in the edge 13 of the fixed rim B and the slot 2 in the detachable rim, and when brought into registered position, by the circumferential movement of the detachable or demountable rim, both slots form a catch or keeper for the head 23 of the trigger. In demounting the rim it is only necessary to disengage the trigger head from its seat, which can be accomplished by forcing the free end of the trigger inward against the uniting bar of the spring. The studs $i$ and $i'$ are firmly secured upon a plate $a$ which is fastened to the felly by screws $a'$, as shown in Figs. 1, 2 and 6 and the working parts of the lock are preferably inclosed by a suitable housing F attached to the felly by screws, as shown in dotted lines in Fig. 6. The front wall $s$ of the housing is provided with a central vertical opening O which is normally closed by a cam lever $m$ pivoted at O' in the side walls of the housing, as shown in Figs. 1 and 6. The cam lever is held in normally closed position by the tension force of the spring $h$ acting upon the cam head S' through the medium of the inner end of the trigger, as shown in Fig. 6.

In operation, the trigger head is disengaged from its seat in the detachable rim and fixed rib by pulling the free end of the cam lever outward until the center of the cam face head S' impinges against the inner end of the trigger, which operation will force said inner end against the tension force of the spring, freeing the head 23 from its engagement with its locking seat. When the center of cam face head is bearing against the inner end of the trigger, the latter will be held against the tension force of the spring $h$, permitting the demountable rim to be circumferentially moved to free the studs 6 from the longitudinal portion 4 of the interlocking depressions and the air-tube from the longitudinal portion 8' of the slot 7, and laterally moved to demount the rim.

It will be noted that the interlocking studs, when moved into locking position, act as drivers to the rim, and cannot be further moved by any cause to jam or become set or distorted, and while the head 23 is seated in the registered slots 2 and 2', across the path of rotation, no shock would result from a reversal of the direction of rotation, and as the parts are hardened and fit close together there is no circumferential vibration. It will also be noted that by the novel construction of the reversely inclined adjacent faces of the rim members any water which may enter between the faces will be quickly thrown out at the highest point or circumferential diameter by the velocity of the traveling wheel, and it will also be noted that the demountable rim bearing surface is reduced to a minimum of contact, the larger portion of the contact being lateral and the smaller portion being circumferential, and that all parts are subject to radial vibration, that is, vibration between the studs, except directly beneath the studs and their cylindrical sides which are in contact with the inclined wall of the longitudinal portion of the depressions. Thus a slight jar in the path of opposite rotation will cause the separation of the members as soon as the head 23 of the trigger is forced out of engagement with its locking seat without the aid of powerful lever appliances to effect their contrary rotation.

Referring to Figs. 7 and 8, the fixed rim member may have its right angle depressions formed by press and die. After the interior has been machine finished the member is placed between suitable dies and subjected to the action of electric heat, all of the depressions being systematically distanced and formed, after which the depending portion R, see Fig. 8, is dressed off flush with the inner surface of the member. The demountable member may be in a like manner operated upon in forming the interlocking studs 6' as shown in Fig. 7 after the member has been properly machined and the projections left integral therewith.

Having thus fully described my invention, what I claim is:

1. A demountable rim for vehicle wheels, comprising a member secured to the felly, a detachable member mounted upon and entirely covering the fixed member, means for locking the two members together to prevent lateral movement of the detachable member, said members having registering slots in one edge thereof, a pivoted lever having a head adapted to enter said slots and lock the detachable member against circumferential movement, means to normally hold said lever in engagement with said slots and a second lever adapted to be turned against said lever to swing the first lever out of engagement with said slots and hold said first lever in its outward position.

2. In a demountable rim the combination with a fixed and a movable member, said members having registering slots in one edge thereof and means to hold said movable member against lateral movement, of a pivoted lever one end of which is adapted to enter said slots and hold the movable member against circumferential movement and a second lever adapted to be turned against said lever to swing said first lever out of engagement with said slots and lock said first lever in its outward position.

3. In a demountable rim the combination with a fixed and movable member, said members having registering slots therein, of a pivoted lever one end of which is adapted to enter said slots and lock the members together, means to normally hold said lever seated in the slots and a lever having a cam thereon adapted to be turned against said locking lever to move the locking lever out of engagement with said slots and hold the locking lever in its outward position.

4. A demountable rim for vehicle wheels, comprising a fixed member provided with interlocking right angle depressions, a detachable member provided with interlocking studs adapted to enter the depressions and lock the detachable member against lateral movement, a spring pressed lever provided with a locking head, registering slots or recesses in the detachable member and the fixed rim adapted to receive the locking head, when said slots are in registered position, to lock the detachable member against circumferential movement and a second lever to swing the first lever out of engagement with said slots and hold the first lever in its outward position.

5. A demountable rim for vehicle wheels, comprising a fixed member having right angle depressions, a detachable member provided with interlocking studs adapted to enter the depressions and lock the detachable member against lateral movement, a spring pressed lever provided with a locking head, slots or recesses in the detachable member and the outer edge of the fixed rim adapted to register with each other and receive the locking head to lock the detachable member against circumferential movement, a cam lever adapted to unlock the spring pressed lever from its engagement with the registered slots, and a housing for the locking mechanism.

CHAS. S. GOODFELLOW.

Witnesses:
C. RISDON ALLEN,
AL. B. GRIFFITH.